United States Patent
Korchinski

(10) Patent No.: US 7,463,937 B2
(45) Date of Patent: Dec. 9, 2008

(54) METHOD AND APPARATUS FOR IMPROVING THE ACCURACY OF LINEAR PROGRAM BASED MODELS

(76) Inventor: William Joseph Korchinski, 1516 Sinaloa Dr., Santa Barbara, CA (US) 93108

( * ) Notice: Subject to any disclaimer, the term of this patent is extended or adjusted under 35 U.S.C. 154(b) by 460 days.

(21) Appl. No.: 11/270,792

(22) Filed: Nov. 10, 2005

(65) Prior Publication Data

US 2007/0106399 A1 May 10, 2007

(51) Int. Cl.
*G05B 13/02* (2006.01)
(52) U.S. Cl. .................................. 700/31; 700/29
(58) Field of Classification Search ............... 700/29, 700/31
See application file for complete search history.

(56) References Cited

U.S. PATENT DOCUMENTS

| | | | |
|---|---|---|---|
| 5,630,070 A | 5/1997 | Dietrich et al. | |
| 6,381,505 B1 | 4/2002 | Kassmann et al. | |
| 6,611,735 B1 | 8/2003 | Henly et al. | |
| 6,731,994 B2 | 5/2004 | Heching et al. | |
| 6,805,074 B2 | 10/2004 | Newcomb et al. | |
| 2007/0100475 A1* | 5/2007 | Korchinski | 700/28 |

OTHER PUBLICATIONS

Aspen Technology, Inc, AspenPIMS Process Industry Modeling System (brochure), copyright 2003, Aspen Technology, Cambridge MA.

* cited by examiner

*Primary Examiner*—Albert DeCady
*Assistant Examiner*—Sunray R Chang

(57) ABSTRACT

A method and apparatus are disclosed for evaluating the performance of a Linear Program model of an operation. The significant properties of the current invention include the use of a historical record or operating data as a means to improve the evaluation of the Linear Program model quality. The historical record of operating data also allows a more reliable means for calculating corrected Linear Program model coefficients. Related applications are disclosed for viewing graphically both the uncorrected and the corrected Linear Program model's performance. Statistical methods are disclosed as further aids in understanding both the uncorrected and corrected Linear Program model's performance.

34 Claims, 8 Drawing Sheets

| Dependent Variable | Actual (BPD) | Current LP (BPD) | Error (%) | Significant? |
|---|---|---|---|---|
| Propane | 1149 | 1102 | 4.0 | No |
| Propylene | 4063 | 3646 | 10.3 | Yes |

| | Cross Correlation | | Update? | |
|---|---|---|---|---|
| Dependent Variable | Sulfur | Aromatics | Sulfur | Aromatics |
| Propane | 0.01 | 0.08 | No | No |
| Propylene | 0.00 | -0.64 | No | Yes |

| Dependent Variable | Actual (BPD) | New LP (BPD) | Error (%) | Significant? |
|---|---|---|---|---|
| Propane | 1149 | 1148 | 0.1 | No |
| Propylene | 4063 | 4067 | -0.1 | No |

FIGURE 7

METHOD AND APPARATUS FOR IMPROVING THE ACCURACY OF LINEAR PROGRAM BASED MODELS

FIELD OF THE INVENTION

The present invention relates generally to a system for improving the accuracy of Linear Program-based models. More particular still, the invention relates to a computerized system for identifying Linear Program prediction errors, automatically calculating a revised set of Linear Program model coefficients, validating the suitability of the revised coefficients and updating the existing Linear Program coefficients with the revised ones.

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO COMPUTER PROGRAM LISTING APPENDICES

The accompanying appendix is comprised of the respectively listed files, all of which are included on the compact disc filed with this application, and incorporated herein by reference:

APPENDIX A—exemplary application, listed here as files designated with extension "vb", is implemented in *Visual Basic*, by Microsoft Corporation, using calls to *NLP*, Copyright 1997, a Quasi-Newton minimization routing by C. David Eagle, Jr. of Littleton, Colo. The exemplary application also uses graphical display components provided by Syncfusion, Essential Suite version 3.0.1.0, Morrisville N.C. and Dundas Chart Software version 4.5.0.1683, Toronto, Ontario, Canada. The exemplary application also comprises a relational database, each table of which is represented here by a files the extension "txt".

Form1.vb 8/31/2005 75,121 bytes
frmMain.vb 8/31/2005 1,264,655 bytes
frmTuning.vb 8/31/2005 54,769 bytes
modLoadModel.vb 8/31/2005 16,424 bytes
modMain.vb 8/31/2005 32,468 bytes
modUsrFun.vb 8/31/2005 48,324 bytes
modUsrReports.vb 8/31/2005 30,256 bytes
CVs.txt 9/15/2005 7,179 bytes
IndependentsNonlinear.txt 9/15/2005 495 bytes
LinearModel.txt 9/15/2005 2,160 bytes
LPVariableTypes.txt 9/15/2005 188 bytes
LPVector_New.txt 9/15/2005 2,112 bytes
LPVectorFromPlant.txt 9/15/2005 2,112 bytes
ModelCoefficientsBase.txt 9/15/2005 2,703 bytes
ModelCoefficientsUpdated.txt 9/15/2005 2,703 bytes
MVs.txt 9/15/2005 1,727 bytes
PlantDataArchive.txt 9/15/2005 47,550 bytes
PlantSolution.txt 9/15/2005 4,618,340 bytes
PlotsEngineer.txt 9/15/2005 22,190 bytes
PlotsOperator.txt 9/15/2005 19,188 bytes
QuickOptimizerContext.txt 9/15/2005 740 bytes
Reports.txt 9/15/2005 157,726 bytes

BACKGROUND OF THE INVENTION

The invention is generally deployed in the context of an "operation", an operation consisting of: a continuous process (such as all or part of an oil refinery, oil and gas production facility, chemical plant pulp mill, steel mill); a utility (steam or hydrogen generation); traffic flow analysis (vehicular, airline); telecommunications; military operations (troop movement, aircraft scheduling); environmental emissions control (automobile, industrial); or any other similar undertaking, having multiple ways of achieving an objective, some more efficient than others.

One example of an "operation" is the modeling of greenhouse gas emissions and emissions trading under the Kyoto treaty, signed in Kyoto Japan in 1997. *Development of an End-Use Model for Analyzing Policy Options to Reduce Greenhouse Gas Emissions*, Mikiko Kainuma et al., IEEE Transactions on Systems, Man, and Cybernetics, Part C 29(3): 317-324 (1999) describes one such operation. The operation modeled here is the amount of carbon dioxide emissions from all sources. The optimization goals include reducing government-induced carbon dioxide emissions, while seeking to minimize costs to consumers. The model includes the effects of subsidy rates and taxation rates as well as mechanisms for generation of carbon dioxide emissions. Different ways of generating and consuming energy result in differing levels of carbon dioxide emissions. Different taxation and subsidy policies lead to a variety of overall cost outcomes to society. Because there are many possible outcomes, the "best" of these must be selected by solving an optimization problem. As proposed by Kainuma et al. the optimization is fundamentally a linear one, although the inclusion of more detailed mechanisms could lead to a more accurate nonlinear model.

Another example of an "operation" comprises a number of factories and warehouses, with each factory capable of producing a suite of goods at a certain cost level. The factories and warehouses are located remotely from each other, so transportation costs depend on the distance from the factories to the warehouses and the quantities of the goods shipped by each route. There are many possible ways to meet the customer demands in such a situation, some more economically favorable than others. By solving an optimization problem it is possible to find the best or optimal solution, according to some criterion, profit being one example; vehicle emissions another. Often these problems are treated as linear ones, although significant nonlinearities can enter the system, one example being a situation where each factory makes products more or less efficiently, depending on the levels of production. This factory/warehouse allocation problem has constraints on the amount of goods produced by each factory, the size of inventory of each warehouse and the availability of transportation for each route.

A third type of "operation" involves military logistics planning. One type of military planning model evaluates the feasibility of supporting military operations and involves the determination of whether different materials can be transported long distances during a crisis, within time constraints. Aircraft and ship movement capacities from different geographical locations are included. There are constraints on asset availability of each asset in each location. One goal of this type of modeling can be to determine which combination of asset movements results in the fastest deployment.

For purposes of brevity, a representative oil refinery process will be used throughout as an illustrative example of an operation.

An oil refinery converts crude oil into a number of commercially important products such as propane, gasoline, diesel fuel, jet fuel and asphalt. The situation is in fact more complicated than this, for a number of reasons. First, each of these products usually has multiple grades (e.g. low, medium or high octane gasoline; high sulfur or low sulfur diesel fuel). Second each product grade sells for a different price. Third, there are hundreds of different types of crude oils, each having its own unique set of properties, each having a price related to those properties, and each having availability which varies by time and location. Fourth, every oil refinery is unique, both in terms of geographical location and in terms of the types of "processes" used to convert crude oil into useful products. In the context used here, a "process" refers to a collection of refining equipment within the refinery, used to perform a specific task, such as separating crude oil, making gasoline and removing sulfur. Examples of processes include Crude Units, Catalytic Crackers, Catalytic Reformers and Distillate Desulfurizers. While a simple refinery can have as few as five processes, a more complicated one can have upwards of twenty different processes. In addition, each process can be run in many different modes or conditions. Finally, the individual products which the refinery makes have demands and product specifications which fluctuate significantly seasonally and annually. *Gary and Handiwerk*, published by Marcel Decker (1984) is an excellent reference, outlining the basics of oil refining.

The combination of these complicating factors—many available crudes, many products made, many processes, many operating modes and many prices—means that a refinery operator must constantly select the single "best" or "optimal" way to run the facility from a bewildering array of possible choices. Of the choices available to a refinery operator, some are not feasible (e.g. cannot pump more oil than the equipment constraints will allow) and many are very expensive (buy finished products from a competitor). The single best choice is the one which satisfies all of the finished product demands and specifications, honors all operational constraints, and does so at the highest possible profit to the refining company. Such a best choice is called the "optimal solution", and is generally made available to the refinery owner through a technique referred to as "optimization."

"Optimization" is a general term. In an oil refinery, the operating staff routinely use many kinds of optimization. Some of these include linear optimization of a single piece of operating equipment (heater, distillation column), non-linear optimization of a process unit (Crude Unit, Catalytic Cracker), non-linear optimization of product blending (gasoline, furnace oil), linear optimization of an entire refinery (Monthly Planning) and linear optimization of a group of refineries (Strategic Planning). All types of optimization have a number of common features, including a "process model", a description of the "process constraints", a definition of the "objective function", a set of "model parameters", "independent variables", "disturbance variables", "dependent variables" and a "mathematical solver." A working definition of each term is provided here. For a more complete description of optimization concepts see *Optimization of Chemical Processes*, Edgar, Thomas F. and Himmelblau, David. M., McGraw-Hill (2001).

A "process model" is a mathematical description of all or part of an oil refinery. Such process models calculate the amount of finished product (gasoline, diesel) made by a modeled process, given a specific amount of raw materials (crude oil or intermediate products) and a set of operating conditions (temperatures, pressures, heating, cooling). Process models are generally based on the laws of chemistry and physics and keep accurate account of the material and energy flows, insuring that these obey the laws of nature (cannot create or destroy mass or energy). Process models represent the actual behavior of the process.

A "process constraint" or "constraint" represents the physical capability of a piece of equipment. A pump, for example, can only pump so much material; when the pump is running at maximum speed, it cannot pump more. In this condition, the pump is said to be at its maximum flow constraint. The process model insures that all of the equipment being modeled does not exceed minimum and maximum constraints on all flowrates, temperatures, pressures or compositions (e.g. gasoline octane, jet freeze point, ethane in propane).

An "objective function" is a way of quantifying how efficiently an operation is running. In an oil refinery, an objective function is often based on profit, which is calculated to be the value of all of the finished products made, minus the costs associated with the raw materials and energy used to make the products. If a given operation's objective function is profit, then the operation's optimum will be that set of conditions (raw materials used, energy consumed, products made, operating conditions) leading to maximum profit. There are other examples of objective functions including for example: minimize pollution, maximize a single product, minimize energy consumption and so on. Typically an objective function is comprised of independent variables, dependent variables and costs (or weighting factors) in some combination. The choice of the best objective function is left up to the owner of the operation.

"Model parameters" refer to a set of numbers which makes a general-purpose process model represent a unique oil refinery. An example of a model parameter is the size of a pump or the diameter of a pipe or how much jet fuel there is in a specific type of crude oil. The model parameters are set to make the process model match a given operation as closely as possible.

An "independent variable" is a variable in a model which can be set at a specific value by a person. A skilled practitioner often also uses the phrase "input variable" or "control" in place of "independent variable". For a given operation, the set of independent variable values will determine the result of the model. An example of a typical independent variable for an oil refinery is the feedrate to a Catalytic Cracker.

A "disturbance variable" is a variable in a model which is fixed at a specific value by external factors. A skilled practitioner often also uses the phrase "feedforward variable" or "condition" in place of "disturbance variable". For a given operation, the set of disturbance variable values will determine the result of the model. An example of a typical disturbance variable for an oil refinery is the ambient temperature.

A "dependent variable" is a variable which is calculated by the model. A skilled practitioner often uses the phrase "output variable" or "product" in place of "dependent variable". The model calculates values for each of the dependent variables, based on the set of model equations, parameters and the values which were specified for the independent variables. An example of a typical dependent variable for an oil refinery is the gasoline product flow from a Catalytic Cracker.

By setting numerical values for the set of disturbance variables and the set of independent variables, a simulation model is said to be "fully specified". Being fully specified means that the model has sufficient information available so that it can calculate values for all of the dependent variables.

A "mathematical solver" or "optimizer" is a technique for finding the optimum for a given process model, a given set of model parameters, constraints and objective function.

One way to view a process model is to compare it the terrain around a mountain. A mathematical solver can be compared to a mathematician issuing instructions to a hiker who wants to get to the top of the mountain (the optimum), which is hard to see because of tall trees. The mathematician searches for the optimum by instructing the hiker to take a step in a certain direction (this is equivalent to trying out a new operating condition in the process model). If by taking a step, the hiker has increased in altitude, the mathematician will likely tell the hiker to keep going in the same direction. If the hiker decreases in altitude, the mathematician will tell the hiker to try a new direction (new operating condition for the model). As the hiker makes progress, the mathematician builds up a general idea of the terrain in the vicinity of the hiker. The hiker may occasionally encounter a fence (constraint), and will be instructed by the mathematician which direction to try next to stay away from the fence and still keep going up. By this type of informed trial and error, the hiker will reach the optimal solution—either the mountain peak or the highest fence on the mountain.

There are many different kinds of process model. These can be broadly classified using the terms "linear", "nonlinear", "steady state", "dynamic", "first-principles" and "reduced."

A "linear" model is one in which the calculated results (e.g. finished products) depend only on linear combinations of the model's inputs (e.g. for a refinery crude oil, operating conditions). A very simple refining example of a linear model is:

Gasoline flow=0.5×Crude oil flow.

A "nonlinear" model is one in which the calculated results (e.g. finished products) depend on both linear and nonlinear combinations of the model's inputs (e.g. for a refinery crude oil, operating conditions). A very simple refining example of a nonlinear model is:

Gasoline flow=0.005×Crude oil flow×Crude oil temperature.

This model is considered nonlinear because two of the model's inputs, crude oil flow and crude oil temperature, are multiplied together.

A "steady state" process model is one in which time is not a model variable. By contrast, a "dynamic" model calculates the process response as a function of time.

A "first-principles" model is one which contains a very detailed description of an operation being modeled. Even though the disclosed invention is applicable to any number of operations, it's helpful to consider a specific example related to oil refining. First-principles oil refineries models first came into use in the 1970s, around the same time the last oil refinery in the United States was built. For an oil refining operation, first-principles models are inherently nonlinear, having as a basis a set of detailed thermophysical hydrocarbon properties such as heat capacity, enthalpy, viscosity, vapor-liquid equilibrium and chemical equilibrium. The *ASTM International reference manual AT029*, ASTM International, Dec. 11, 2004 is a good example of such a set of thermophysical hydrocarbon properties. In a first-principles model, these hydrocarbon properties are used to construct all heat, mass and component balance relationships using known equations for various refinery process operations such as distillation, heat exchange and chemical reaction. First-principles models for oil refining, which are available on the open market, are as a general rule extremely complex, both in terms of the types and large numbers of equations they contain. A first-principles model for a single refinery process (e.g. Catalytic Cracking) will contains many tens of thousands of nonlinear equations. Modeling an entire refinery with a first-principles approach could require hundreds of thousands of equations.

The inherent complexity and size of such models makes them accurate over a wide range of operating conditions, as well as allowing the models to be very general. But accuracy and flexibility come with the price that such large models require special expertise to use and maintain, and the mathematical solvers used are themselves complicated and prone to failure.

Returning to the question of how a refinery operator might best optimize the operation, one approach is to use a "Linear Program" (or "LP") to simulate and optimize the entire refinery over a long time period, typically a month. Linear Programming was developed by IBM and its application to oil refining is well-documented in *An Introduction to Linear Programming*, IBM Technical Publications Department, White Plains N.Y., 1964. As one would expect from its name, Linear Programming is a based on a linear model of the operation. The practice of using Linear Programming to optimize refining operations is well established and widespread. Today most refiners routinely use a Linear Program once a month to select the best crude purchases and modes of operation for the current set of product demands, prices and operational constraints.

Practitioners skilled in the art will generally construct an LP model that has as set of "base" vectors and a set of "shift" or "delta" vectors. A base vector is a linear representation (set of LP model coefficients) which relates LP model dependent variables to the main LP model independent variables. For a Catalytic Cracker, an example of a base vector coefficient could be the one relating how much gasoline is made for every barrel of feed to the process. A base vector coefficient of 0.5 would mean that for every barrel of feed to the Fluid Catalytic Cracker, 0.5 barrels of gasoline would be produced. A shift vector is a set of LP model coefficients which relates the incremental changes in dependent variables to incremental changes in secondary LP independent variables. For a Fluid Catalytic Cracker, an example of a shift vector coefficient could be how much less gasoline results for each increment of sulfur in the feed. A shift vector coefficient of −0.01 would mean that for every 1 percent increase of sulfur in the feed, the gasoline flow would drop by 0.01 barrel for each barrel of feed.

Frequently, the initial set of linear model base coefficients used by an LP is derived from rules of thumb, readily-available operating data and engineering judgment. Although this is a common approach, it yields only very approximate LP coefficients. Furthermore, it is extremely difficult to produce reliable shift vector coefficients using this approach, a fact well-known to practitioners skilled in the art. When a Linear Program has been supplied with a representative set of base and shift vector coefficients, it is said to have been calibrated.

A second method of obtaining LP base coefficients for an operation is to make direct measurements of the operation itself. Such direct measurements are generally the result of carefully planned tests, where operating conditions are fixed and held for long periods of time. In an oil refinery example, a Fluid Catalytic Cracker will be held at a fixed feed rate, with fixed feed composition and fixed temperatures, pressures and flows for all of the major independent variables, for a day or two. During this period, the resulting product flows and compositions (dependent variables) will be measured. LP model coefficients will be calculated using the knowledge of the dependent and independent variables values. However, as with the method above, using operating data to produce shift vector coefficients is notoriously unreliable, a fact known to practitioners skilled in the art.

A third technique called "Recursion" is used by those skilled in the art as a way to update linear program model coefficients by means of nonlinear model results. A commercial example of this can be found in the Aspen Technology, Inc. software product known as Aspen PIMS™ as described in Aspen Technology product brochure PB 136 9/03, copyright 2003. In recursion, the linear program coefficients are periodically updated at certain stages during the linear program solution iterations via a nonlinear model, which supplies more accurate coefficients. The recursion calculation can be stated simply as:

$$G=h(X) \qquad \text{Equation 1}$$

In Equation 1, X is the set of independent variable values at the current LP solution step, G is the corrected set of linear program coefficients and h(X) is the nonlinear model slopes evaluated at X. One advantage of recursion is that the method is capable of producing shift vectors of fairly reliable quality.

An extension to recursion is a technique called "Nonlinear Programming" or NLP. NLP techniques are used to solve the same types of problems as LP, but in the case of NLP, the model is nonlinear and the solvers used are designed for solving nonlinear problems.

Each method of obtaining LP model coefficients has advantages and disadvantages. The simplest method (using rules of thumb, etc.) can be done quickly, but yields very approximate LP model base coefficients, and cannot produce accurate shift coefficients. The second method (measuring the operation directly) is time consuming and expensive, but yields relatively more accurate LP model coefficients. However, this method is also incapable of producing reliable shift vector coefficients. The third method of recursion has the potential to produce the most accurate LP model (both base and shift coefficients), but is however burdened with complexity due to the fact that recursion requires nonlinear models to be solved indirectly by the LP algorithm, which is designed to solve only linear problems.

In general, linear programming techniques suffer from the shortcoming that linear models fail to capture significant nonlinearities in the operation. Because of this, the linear optimal solution only approximates the true nonlinear optimum. That is, where nonlinearities are significant, the linear programming approach will fail to fully optimize the operation. Generally, LP models are constructed once at an initial point in time, using the best information available. However, over time, these linear models become less accurate as operating conditions change. An oil refining example would be when a linear program is used to optimize a Catalytic Cracker. When the linear model is first constructed, assumptions are made regarding the feed types and operating conditions of the Catalytic Cracker, and the linear model is based on these. Over the coming months and years, however, the operating conditions will change, with new types of feeds being present. Furthermore process performance will change or deteriorate due to equipment failure, or because the process was deliberately reconfigured. The accumulation of such changes over time will cause the actual process behavior to deviate significantly from the original linear model used to optimize it.

One common technique for keeping LP models accurate, practiced by those skilled in the art, is called "backcasting". Backcasting essentially consists of using the LP model to calculate some past operating point, and comparing the difference between the actual operating point, and the LP model prediction of it. This difference is then used to correct the LP model coefficients so as to reduce or eliminate the difference between the known past operating point, and the LP model's prediction of it. To summarize, LP models are only approximate, either because the LP model base and shift coefficients are not exact, or because the operation behavior has changed, or because the operation behavior is significantly nonlinear. LP model coefficients are initially generated using estimates. These estimates result in LP model prediction errors relative to the actual operation. The errors are further compounded by the facts that operating conditions change and deteriorate over time and that operations are often nonlinear in significant ways. Practitioners skilled in the art try to deal with these LP model inaccuracies in various ways, either through backcasting, recursion or by more frequently collecting data from the operation. The main shortcoming of backcasting is that as it is currently practiced, only single operating points are used to generate corrective LP coefficient feedback, which is a poor statistical basis for measuring model performance in the face of significant measurement error, noise and bad data originating in the operation. Furthermore backcasting as currently practiced cannot produce reliable corrections for shift vectors. The main shortcoming of recursion is that it requires nonlinear models to be handled by a linear LP solver. This can produce unacceptably long solution times and can also result in suboptimal solutions. Using plant data as the basis for LP model coefficients can be a satisfactory way to generate base vector coefficients, but as is known to practitioners skilled in the art, it is nearly impossible to produce reliable shift vector coefficients using operating data. Although NLP is showing promise in LP-type applications, the models and the algorithms for solving them are significantly more complicated than the ones used for LP. This complexity results in additional cost, both in terms of replacing older technology with newer, and also in terms of the manpower required to keep NLP applications working.

A LP model is a very valuable optimization tool, widely used in applications as diverse as oil refining, telecommunications, shipping, airline scheduling, natural gas production, utilities, military logistics, automotive and many others. However measuring and improving the LP model accuracy relative to the actual operation is a critical and often-neglected area. What is needed is a system to track the departure of the linear LP model from the performance of the operation over time, and then to reliably correct the LP base and shift vector coefficients so as to increase the model's accuracy. The present invention directly addresses these needs and provides other advantages.

OBJECTS AND SUMMARY OF THE INVENTION

The current invention seeks to measure LP model accuracy and to improve it. This is achieved by comparing LP model predictions relative to the operation over some time period, in order to generate a record of the prediction errors over that period. A mathematical problem is then solved so as to calculate a set of nonlinear model coefficients that reduces the total prediction error. Next, the newly-fit nonlinear model is used as a basis to generate a set of LP base and shift model coefficients. These corrected LP base and shift model coefficients are tested to verify that the corrected LP predictions (based on corrected LP coefficients) are indeed more accurate than the previous ones (based on uncorrected LP coefficients). Graphical displays and statistical tables aid the user in evaluating both the initial and final LP prediction errors. Note that although an illustrate oil refining example is used here, the current invention is not limited to oil refining, but can be applied to any operation which is modeled using a Linear Program.

In more detail, the first step is to measure the accuracy of the LP model predictions as compared to the operation. This requires a historical record of those independent variables required to carry out the LP calculations as well as those dependent variables required for comparison with the LP predictions. For a Catalytic Cracker, such a record might consist of all of the necessary independent variables and dependent variables, stored at one week intervals for a period of 4 months. Independent variables might include feed rate, reactor temperature and feed sulfur content. Dependent variables might include the product flows of gas, propane, gasoline, diesel and fuel oil. The LP model is used to calculate for each point in the historical record, a prediction for each of the dependent variables. This record of model predictions is then compared to the record of actual operation to produce an aggregate error between the prediction and the actual for each dependent variable. This aggregate error is the overall measure of the ability of the LP model to predict the operation. Graphical and statistical tools are provided at this step to assist the user in appraising the LP model accuracy.

The second step is to solve a mathematical problem which seeks to minimize the error between the measured dependent variables of the operation and a reference model's prediction of these dependent variables. The error is calculated based on the historical record to date of the dependent variables, and the reference model's prediction for each dependent variable for each historical point. A mathematical method is used to find that set of reference model parameter values which most reduces the prediction error between reference model and the operation. During this step the reference model parameters are constrained so as to keep them within a reasonable range. In this step, the reference model used can be either a nonlinear model of the operation, or it can be the existing LP model coefficients. If the reference model comprises a nonlinear model, then the model parameters are embedded in the nonlinear model equations. If the reference model comprises the existing LP model coefficients, then the model parameters are the LP model coefficients themselves.

In the third step, the reference model which was fit (so as to minimize prediction error) is used to generate a corrected set of LP base and shift coefficients. This is accomplished by taking the derivative of each of the dependent variables with respect to each of the independent variables, using the newly-fit reference model as the means to generate dependent variable values for each set of independent variable values. This step is not required if the reference model is the LP model.

In the fourth step, the corrected LP coefficients are used to predict the historical record of the dependent variable values so that these can be compared to the actual values from the operation. This verification step seeks to demonstrate that the corrected LP coefficients are indeed better predictors of the behavior of the operation than were the uncorrected LP coefficients. Graphical and statistical tools are provided at this step to assist the user in appraising the LP model accuracy. After the user is satisfied that the corrected LP model coefficients are improved over the previous ones, the uncorrected coefficients can be replaced with the corrected ones.

This method of measuring and improving LP model accuracy has a number of advantages over prior art. Because the current invention can be considered to be an auxiliary technology to LP, there is no need to modify or replace the existing installed base of LP applications with either recursion techniques or with NLP-based techniques. Because most of these applications have been assembled by many people over periods of many years, they have become deeply ingrained in the institutions where they are routinely used.

A second significant advantage of the current invention is that it uses a historical record of operation data to evaluate the performance of the LP. The prior art involves techniques such as backcasting which evaluate LP error using only a single point of operational data. Such single-point techniques are highly subject to measurement error and noise and as a result have questionable statistical validity. By contrast, the current invention uses as many historical operating points as can be made available, thereby increasing the statistical likelihood that the comparison between the LP prediction and the actual operation is a valid one.

A third advantage of the current invention over prior are is the use of graphical tools to compare the LP model predictions against the actual operation. As will be seen later, these graphical tools are relevant for both base and shift vectors.

Finally, because the current invention is based on a number of historical operating points, statistical judgments can be made on the mismatch between the LP predictions and the actual operation. Such statistical judgments can be presented in numerical form to the user.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which:

FIG. 7 depicts three statistical analyses. The first of these summarizes the size of the LP prediction error when uncorrected LP model coefficients are used. The second summarizes the cross-correlation between LP-predicted dependent variables and independent variables, when uncorrected LP model coefficients are used. These first two statistical tables are measures of the mismatch between the LP prediction and the actual operation when uncorrected LP coefficients are used. The third statistical analysis summarizes the size of the LP prediction error when corrected LP model coefficients are used.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

It is initially noted that the present invention will be implemented preferably in software for use with any general purpose computer having a CPU, memory, an input device (keyboard) and a display device (CRT). Said computer is capable of performing the software operations described below. The invention can be viewed as a general purpose computer which is operated in accordance with programming incorporating the invention. Since computers of the type necessary to perform the operations described below are known, no further detailed description is made herein. Similarly, since software languages capable of performing the operations described below are known, no further description is necessary.

In this discussion, an example of a specific refining process, a Catalytic Cracker, will be used throughout for clarity of illustration. The use of a Catalytic Cracker in the discussion in no way limits, however, the applicability of the invention to this single illustrative example. *Gary and Handiwerk*, Marcel Dekker (1984) contains an excellent reference describing the specific operation of a Catalytic Cracker as well as a general description of the principles of oil refining.

Figure 1:
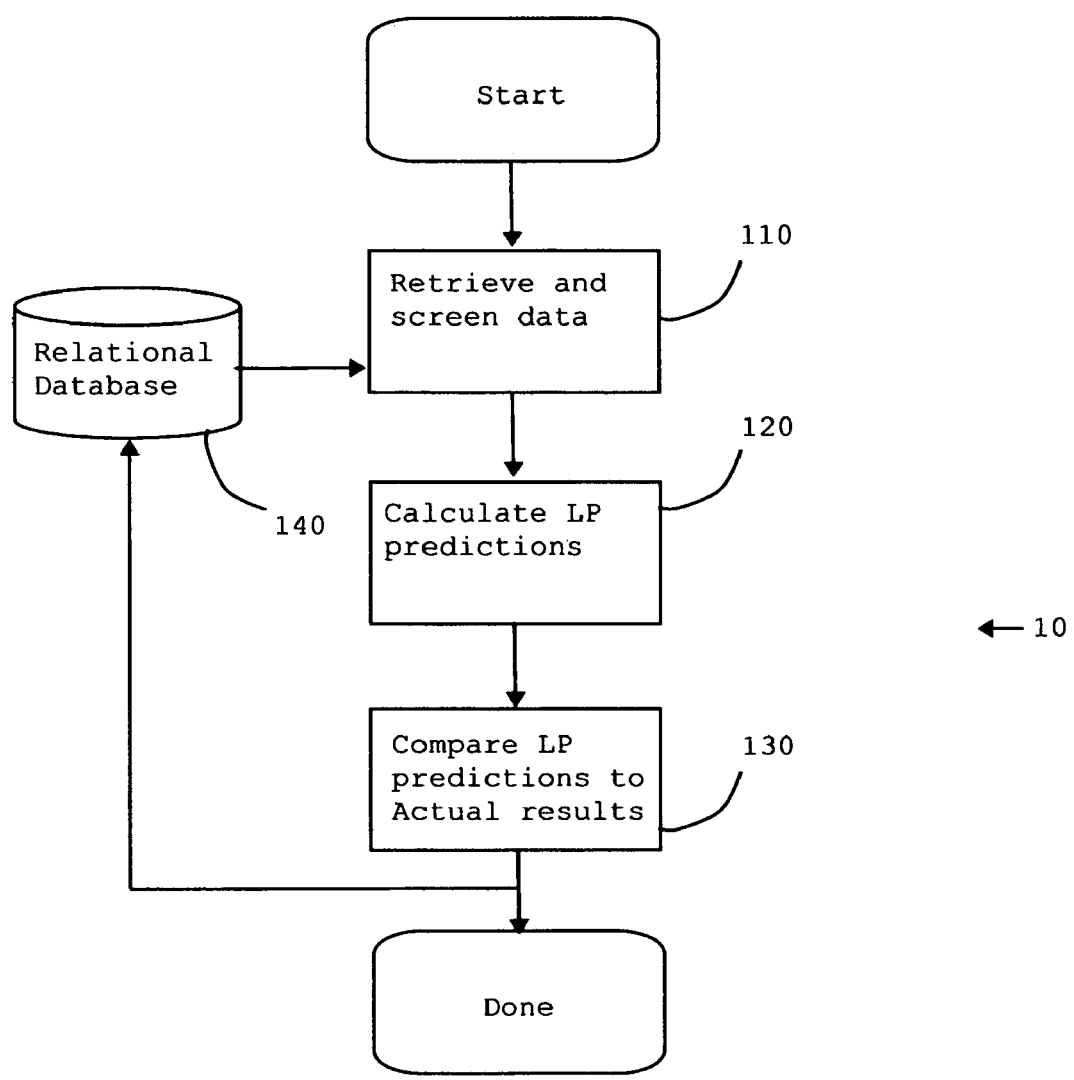
FIG. 1 comprises a block diagram showing at a high level the method of comparing the LP predictions to actual operating data. It is presumed that a LP model of the operation is available, and that it already contains a set of model coefficients.

Referring to FIG. 1, the LP prediction error analysis method begins with data retrieval step 110, where historical operating are fetched from relational database 140. The data retrieved in step 110 comprise a series of sets of independent variables and dependent variables, each set consisting of operating data from a specific point in time. In each set of data, the independent variables are those necessary to specify a single LP result. In addition, other independent variables may be included in this set if they are required to specify a corresponding nonlinear model of the operation. The dependent variables contained in a single set of data are those which are calculated by the LP, as well as any additional ones which may be required to characterize and fit a corresponding nonlinear model of the operation. The points in time for each set of data can be equally spaced or they can be arbitrarily spaced. Once retrieved, the data must be subject to screening which seeks to remove any bad or noisy measurements which may be present in the historical record. Data screening involves a combination of statistical techniques known to the skilled practitioner including "Projection to Latent Structures" (PLS) and heuristics such as the checking of historical data against reasonability limits. An excellent reference for PLS and other data modeling techniques can be found in *Erikson, Johansson, Kettaheh and Wold*, Umetrics (2001). Data which fail such reasonableness checks are filtered for noise removal, discarded and replaced with estimates, or replaced with surrogate measurements. Such data filtering and replacement techniques are also known to those skilled in the art.

In LP prediction step 120, the LP with uncorrected model coefficients is used to produce a prediction for each dependent variable at each of the discrete time points in the historical record. This prediction is carried out by presenting the LP with the independent variables it need to calculate a set of dependent variables. The result of this step is a series of predicted dependent variable values for each time step in the historical record.

In LP comparison step 130, the predicted LP results from step 120 are compared with the actual operating results from step 110. Such predictions can be shown either as tabular data or as plots. For plotted results, there will be one plot for each dependent variable, with time appearing on the x-axis and dependent variable value on the y-axis. Each plot will contain two tracks of data with one track showing the predicted LP result and the other showing the actual operating data. Each of these plots will indicate how well the LP predicts the actual historical operation for a single dependent variable. An example of these plots will be described later in relation to FIG. 2. A second type of result is also provided as part of LP comparison step 130. This second type of plot shows the effect of independent variables on the LP prediction error. In these plots, there will be on plot for each independent/dependent variable pair. The LP prediction error will appear in relation to the y-axis and the independent variable value will appear in relation to the x-axis. Each of these plots will indicate which independent/dependent variables are correlated, where significant correlation indicates that the shift vector for that independent/dependent pair may need revising. An example of these plots will be described later in relation to FIG. 3.

The final step shown in FIG. 1 is to update relational database 140 with any new information such as newly-screened operation data, LP prediction error calculations or other information which may be used at a later time.

Figure 2:
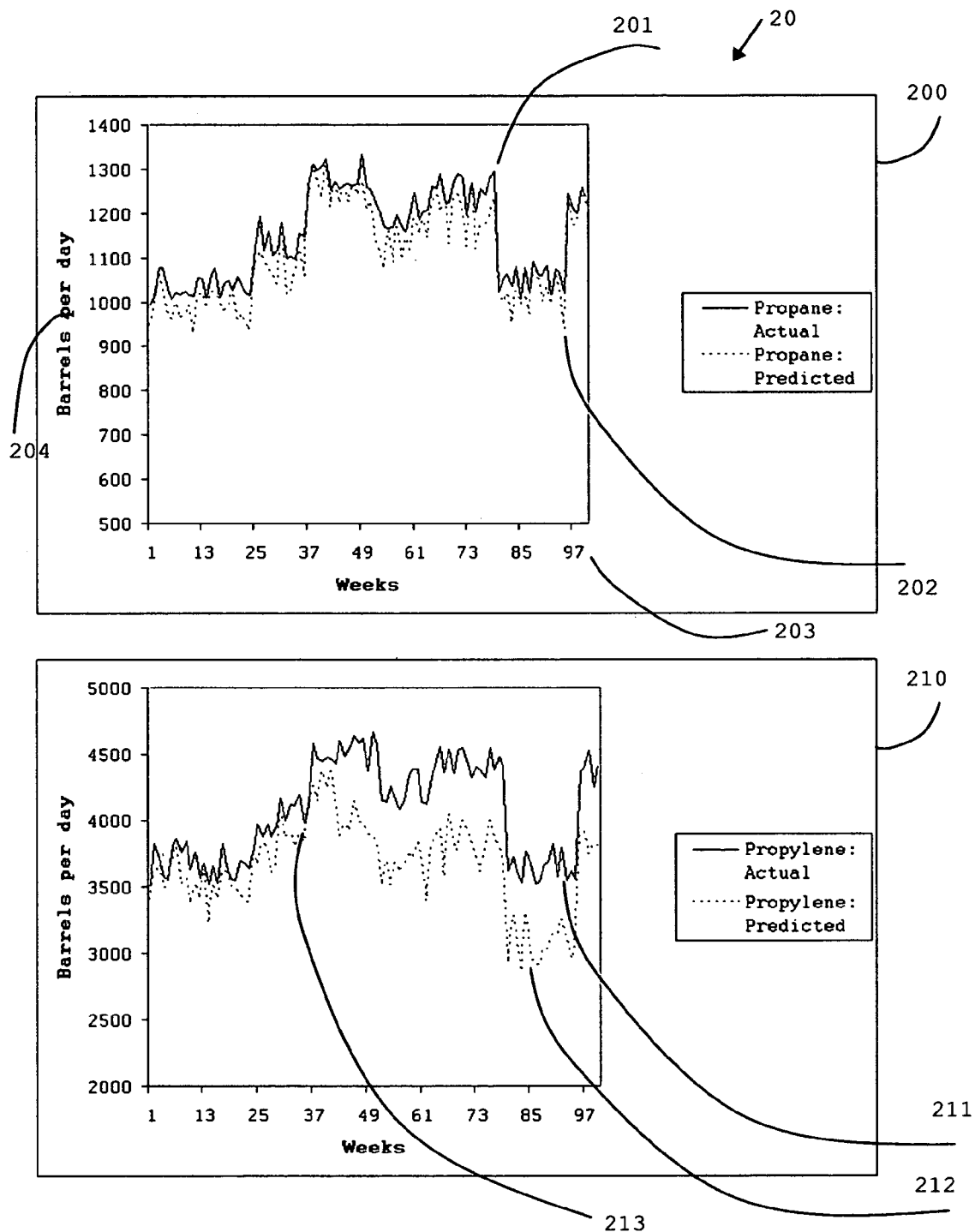
FIG. 2 depicts of a graphical display showing the match between the LP prediction, using uncorrected model coefficients, and the actual operation for two dependent variables over a historical period.

FIG. 2 shows an exemplary comparison of actual operational results with predicted LP results using a Fluid Catalytic Cracker. The LP predicted results are calculated according to equation 1:

$$YLP = A*X \qquad \text{Equation 1}$$

Where:
YLP=the vector of predicted dependent variables
A=the matrix of LP model base and shift coefficients
X=the vector of measured independent variables There is one prediction YLP for each set of independent variables X in the historical record.

Upper plot 200 depicts the comparison for propane product flow, and contains two data tracks labeled 201 and 202. Data track 201 (solid line) is the actual propane product flow in barrels per day (label 204) and is trended over a historical time period, of just over 97 weeks (label 203). Data track 202 (dotted line) is the LP predicted propane flow in barrels per day, where the LP prediction is made using uncorrected LP coefficients. The two data tracks 201 and 202 correlate very well and exhibit little significant persistent offset. Lower plot 210 depicts the comparison for propylene product flow, and contains two data tracks labeled 211 and 212. Data track 211 (solid line) is the actual propylene product flow in barrels per day (label 204) and is trended over the same historical time period as shown in the upper plot 200. Data track 212 (dotted line) is the LP predicted propylene flow in barrels per day, where the LP prediction is made using uncorrected LP coefficients. A significant and persistent offset appears around week 49 as indicated by label 213. This offset between the LP prediction and the actual operation indicates that something has changed in the operation which causes the LP to stop accurately predicting the operation, and that the uncorrected LP coefficients are no longer valid.

Figure 3:
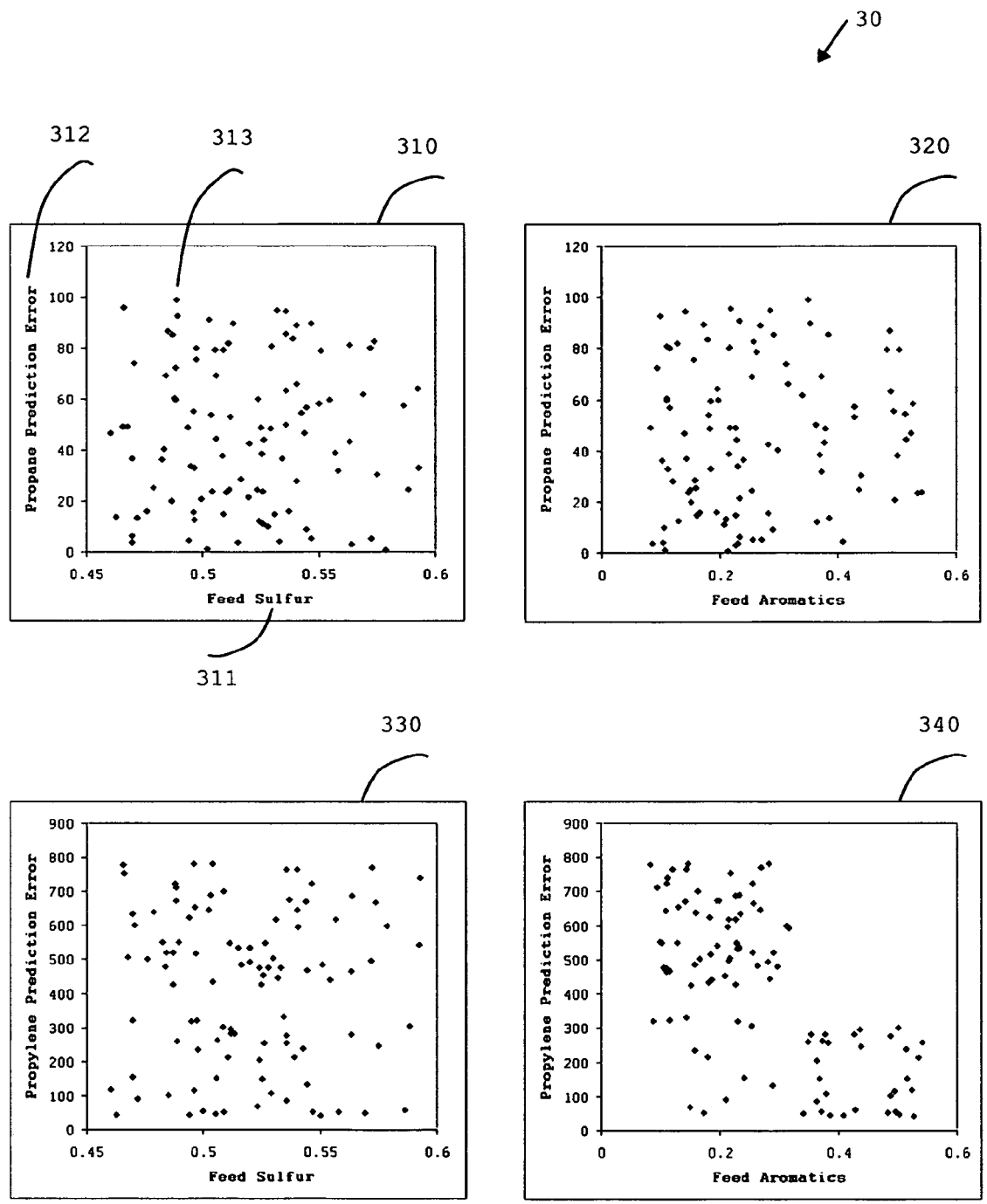
FIG. 3 depicts an example of a graphical display showing the correlation between two LP-predicted dependent variables and two LP independent variables. The LP predictions are based on the uncorrected LP model coefficients. Such a graphical display can be used to locate shift vector errors.

FIG. 3 shows an exemplary comparison of LP prediction error as it relates to the independent variables which are used as shift vector inputs. Prediction error is defined according to Equation 2.

$$YERROR = YLP - YACTUAL \qquad \text{Equation 2}$$

Where:
YERROR=the vector of prediction errors
YLP=the vector of predicted dependent variables
YACTUAL=the vector of measured dependent variables There is one prediction error vector for each set of dependent variables in the historical record. X-Y chart 310 is based on a Fluid Catalytic Cracking example. Chart 310 shows the propane LP prediction error 312 on the y axis in barrels per day versus feed sulfur content 311 on the x axis in weight percent. Each point (e.g. 313) on chart 310 shows a single value of propane LP prediction error as a function of feed sulfur weight percent. Taken together, all of the points on chart 310 show how propane LP prediction error varies as a function of feed weight percent sulfur. Chart 310 shows no visible correlation between LP error and feed weight percent sulfur. Similarly chart 320 shows the relationship between propane LP prediction error and feed aromatics content. As in chart 310, chart 320 shows no visible correlation between the LP prediction error and the feed aromatics content. Chart 330 shows the relationship between propylene LP prediction error and feed sulfur content. Chart 340 shows the relationship between propylene LP prediction error and feed aromatics content. Unlike charts 310, 320 and 330, chart 340 exhibits a pattern in the data, indicating that feed aromatics content has an effect on propylene LP error. Taken together, charts 310, 320, 330 and 340 indicate which independent variables have a visible impact on which LP prediction errors. Where a visible correlation is seen to exist, the interpretation is that the shift vector LP model coefficient for that independent/dependent variable pair needs to be updated.

Figure 4:
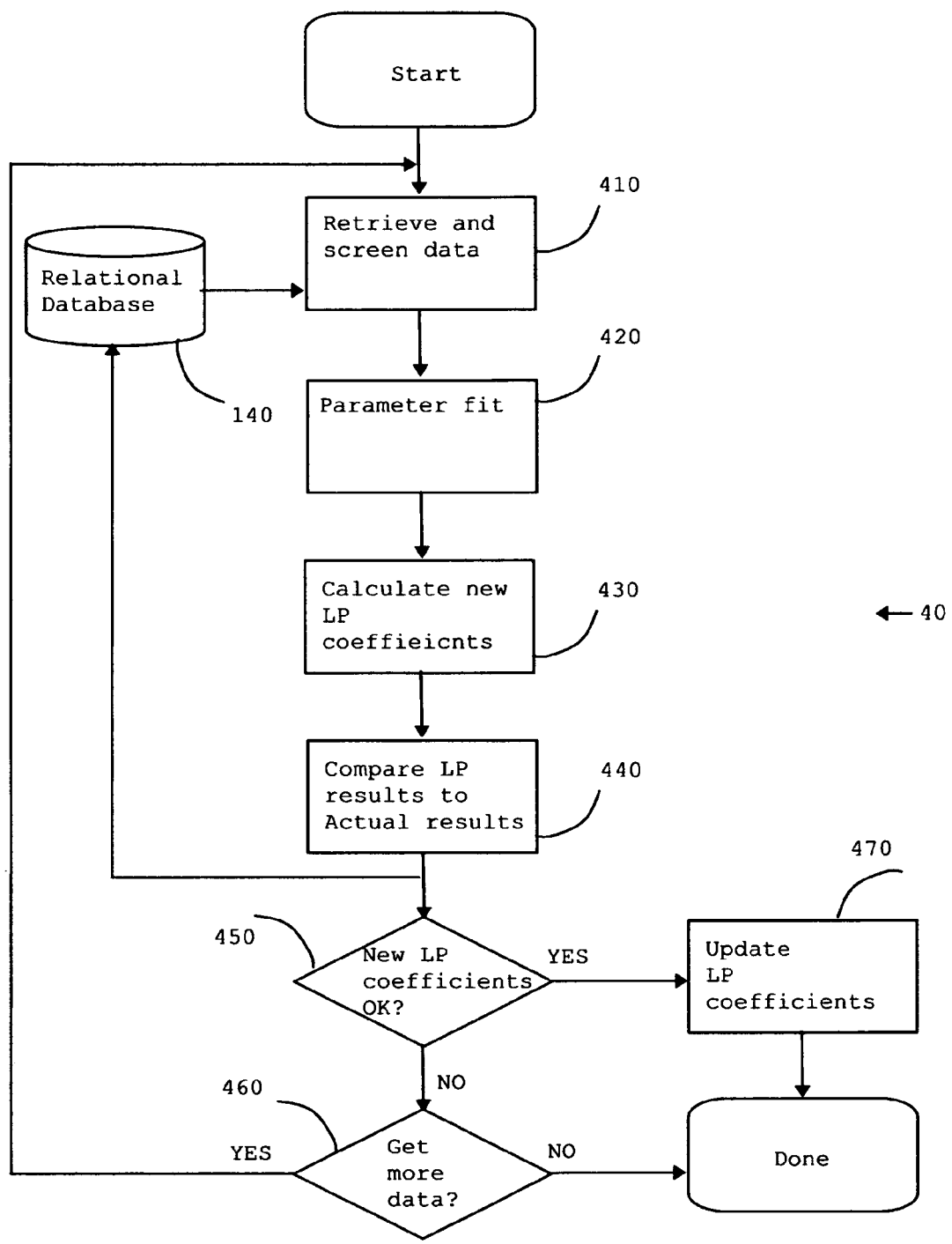
FIG. 4 comprises a block diagram showing at a high level the method of calculating the corrected LP model coefficients, subsequently comparing the corrected LP predictions to actual operating data, and updating the LP if the corrected coefficients are found to be suitable.

Referring to FIG. 4, the LP coefficient calculation method begins with data retrieval step 410, where historical operating are fetched from relational database 140. The data retrieved in step 410 comprise a series of sets of independent variables and dependent variables, each set consisting of operating data from a specific point in time. In each set of data, the independent variables are those necessary to specify a single LP calculation. In addition, other independent variables may be included in this set if they are required to specify a corresponding nonlinear model of the operation. The dependent variables contained in a single set of data are those which are calculated by the LP, as well as any additional ones which may be required to characterize and fit a corresponding nonlinear model of the operation. The points in time for each set of data can be equally spaced or they can be arbitrarily spaced. Once retrieved, the data must be subject to screening which seeks to remove any bad or noisy measurements which may be present in the historical record. Data screening involves a combination of statistical techniques known to the skilled practitioner including "Projection to Latent Structures" (PLS) and heuristics such as the checking of historical data against reasonability limits. An excellent reference for PLS and other data modeling techniques can be found in *Erikson, Johansson, Kettaheh and Wold*, (see earlier reference). Data which fail such reasonableness checks are filtered for noise removal, discarded and replaced with estimates, or replaced with surrogate measurements. Such data filtering and replacement techniques are also known to those skilled in the art.

In parameter fit step 420 a reference model is used to predict the set of dependent variables for each set of independent variables in the historical record. The reference model can either be a nonlinear model, or it an be the LP model itself. An error is then calculated between each calculated dependent variable and its measured counterpart (from operational data). This error calculation is done for each historical point and then integrated over the totality of the points in the historical dataset. A mathematical technique is used to solve for the set of reference model parameters which best minimizes the total dependent variable error. In equation form, parameter fit step 420 can be summarized by Equation set 3:

$$Gi = f(B, Xi)$$

$$Ei = Gi - Hi$$

$$ET = \text{sum}(Ei * Ei), i=1, n$$

$$\text{Min}(ET) \text{ s.t.}$$

$$B >= BL$$

$$B <= BH$$

$$|dB| < dL \qquad \text{Equation set 3}$$

Where:
i=point number in historical record
Gi=calculated dependent variable vector at point i
B=set of reference model parameters
Xi=measured independent variable vector at point i
F(B, Xi)=reference model functions
Ei=dependent variable prediction error vector at i
Hi=measured dependent variable vector at i
ET=Total dependent variable error squared
n=number of points in historical record
BL=vector of lower bounds on parameters
BH=vector of upper bounds on parameters dB=vector of parameter changes from initial point
dL=vector of bounds on parameter changes Note that according to Equation 3, the model parameters and the changes in the model parameters from the initial point are bounded between upper and lower limits. In effect the parameters are solved in order to minimize the reference model dependent variable prediction error relative to the measured dependent variables, while ensuring that the model parameters remain in reasonable ranges.

LP calculation step 430 begins with the fitted reference model of parameter fit step 420. In LP calculation step 430, a corrected set of LP base and shift vector coefficients is calculated by differentiating the reference model dependent variables relative to the independent variables according to Equation 4.

$$ANEW=d(f[Bf,Xr])/dXr \qquad \text{Equation 4}$$

Where:
ANEW=corrected LP model base and shift coefficients
Bf=the reference model coefficients from step 420
Xr=reference values for independent variables
f[Bf, Xr]=reference model predicted dependent variables
d=differentiation operator In Equation 4, the user specifies which values to supply for Xr, a practice known to those skilled in the art. Note that when the reference model is the LP model itself, this differentiation step is not required.

In LP result comparison step 440, corrected LP predictions are generated using the corrected set of LP model coefficients using the procedures shown in Equation 5 and Equation 6. The corrected LP predictions are saved in database 140 for later plotting, charting and analysis.

$$YLPNEW=ANEW*X \qquad \text{Equation 5}$$

Where:
YLPNEW=corrected vector of predicted dependent variables
ANEW=corrected LP model base and shift coefficients
X=the vector of measured independent variables In decision step 450, the user has a choice based on the appraised quality of the corrected LP coefficients. If the corrected LP coefficients have been judged adequate, then the user elects to proceed to LP update step 470, where the corrected LP coefficients (ANEW) are loaded into the LP model for later use, and then the method terminates. If the corrected LP coefficients have been judged inadequate in decision step 450, the user elects to either return to collect more data or to finish the analysis in data step 460. If additional data have been requested, the method returns to data retrieval step 410. If additional data are not required, the method terminates.

Figure 5:
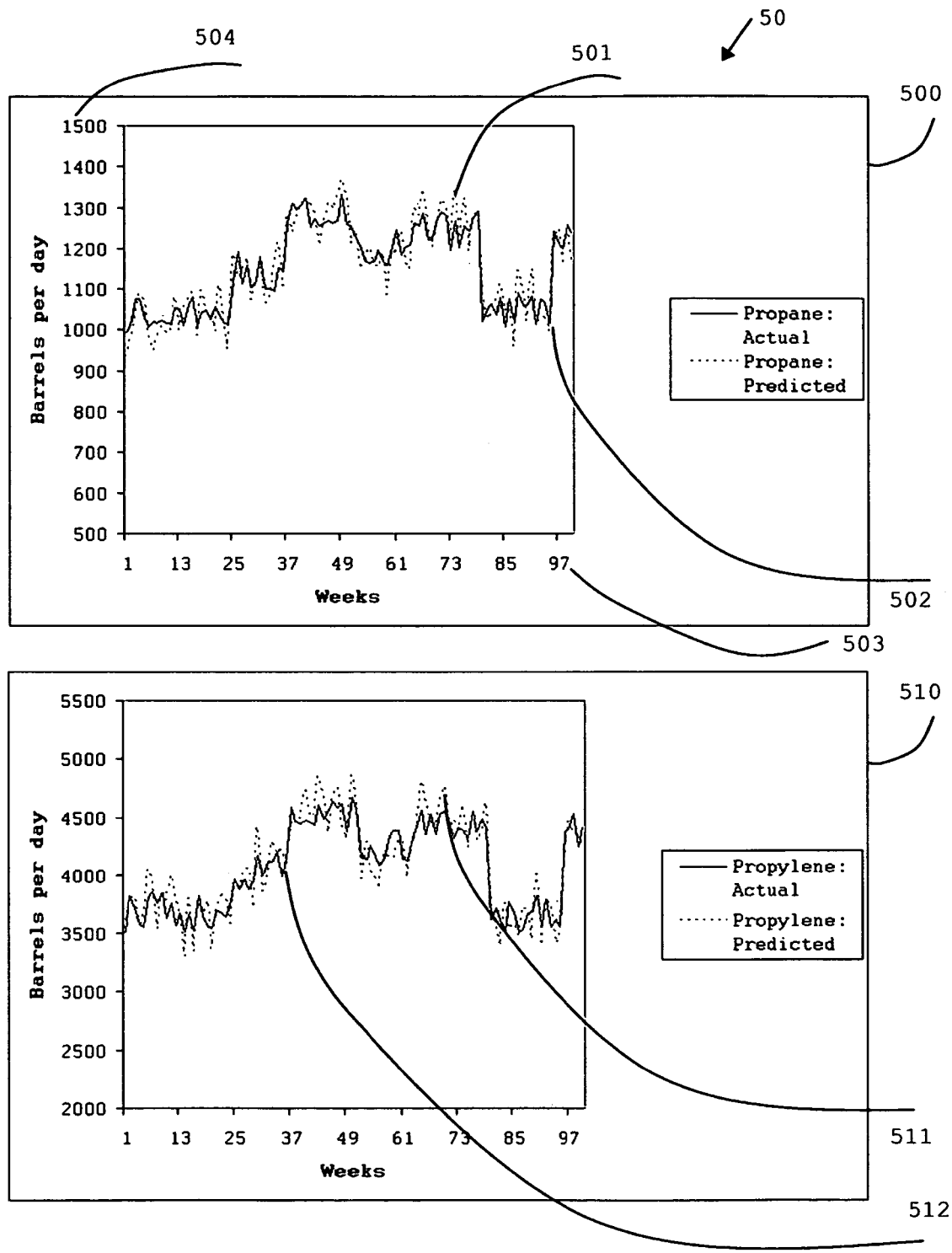
FIG. 5 depicts an example of a graphical display showing the match between the LP prediction, using corrected model coefficients, and the actual operation for two dependent variables over a historical period.

FIG. 5 shows an exemplary comparison of LP prediction error as it relates to the independent variables which are used as shift vector inputs. The data in FIG. 5 are exemplary, based on a Fluid Catalytic Cracker. There are two plots comparing actual measured product flows with the LP predictions based on the corrected LP model coefficients; upper plot 500 for propane and lower plot 510 for propylene. Upper plot 500 shows two data tracks indicated by dotted line 501 which corresponds to the corrected LP prediction for propane and solid line 502 which is the actual measured propane flow. The flows are in barrels per day, as indicated by y axis 504 and they are compared over a period of 97 weeks as indicated by x axis 503. With the corrected LP model coefficients, the LP prediction of propane closely matches the actual measured propane flow. Lower plot 510 shows two data tracks indicated by dotted line 511 which corresponds to the corrected LP prediction for propylene and solid line 512 which is the actual measured propylene flow. With the corrected LP model coefficients, the LP prediction of propylene closely matches the actual measured propylene flow.

Figure 6:
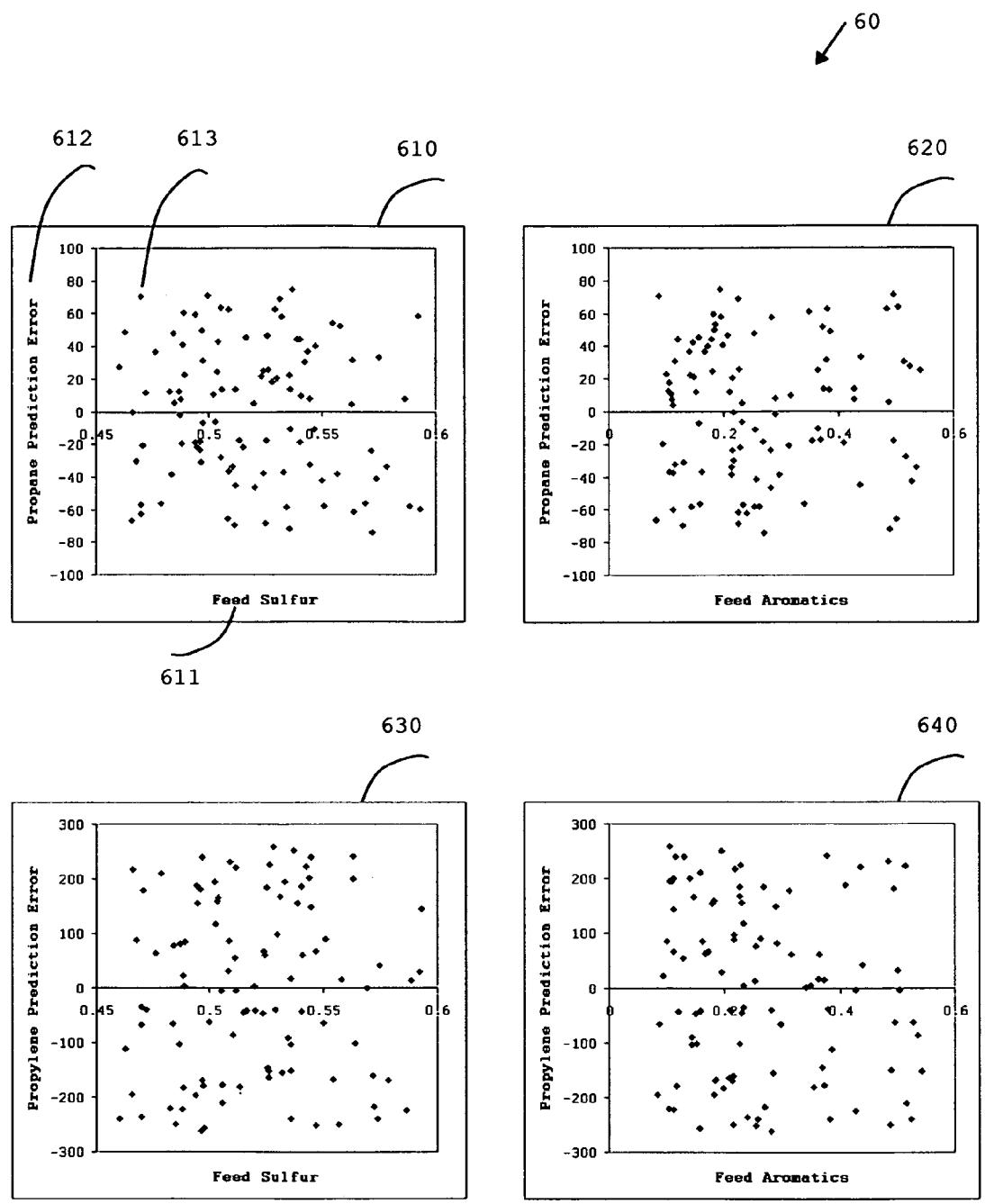
FIG. 6 depicts an example of a graphical display showing the correlation between two LP-predicted dependent variables and two LP independent variables. The LP predictions are based on the corrected LP model coefficients. Such a graphical display can be used to verify that shift vector errors are no longer present when the corrected LP model coefficients are used for predicting the dependent variables.

FIG. 6 shows an exemplary comparison of LP prediction error as it relates to the independent variables which are used as shift vector inputs. Prediction error using the corrected LP model coefficients is defined according to Equation 6.

$$YERRORNEW=YLPNEW-YACTUAL \qquad \text{Equation 6}$$

Where:
YERRORNEW=prediction errors (corrected LP)
YLPNEW=predicted dependent variables (corrected LP)
YACTUAL=the vector of measured dependent variables There is one prediction error vector for each set of dependent variables in the historical record. X-Y chart 610 is based on a Fluid Catalytic Cracking example. Chart 610 shows the propane LP prediction error 612 on the y axis in barrels per day versus feed sulfur content 611 on the x axis in weight percent. Each point (e.g. 613) on chart 610 shows a single value of propane LP prediction error as a function of feed sulfur weight percent. Taken together, all of the points on chart 610 show how propane LP prediction error varies as a function of feed weight percent sulfur. Chart 610 shows no visible correlation between LP error and feed weight percent sulfur. Similarly chart 620 shows the relationship between propane LP prediction error and feed aromatics content. As in chart 610, chart 620 shows no visible correlation between the LP prediction error and the feed aromatics content. Chart 630 shows the relationship between propylene LP prediction error and feed sulfur content. Chart 640 shows the relationship between propylene LP prediction error and feed aromatics content. In all of the charts 610, 620, 630 and 640 there is no correlation between any of the LP prediction errors and independent variables. Taken together, charts 610, 620, 630 and 640 indicate that because there is no correlation between any of the LP prediction errors and independent variables that none of the shift vector LP model coefficients require updating. This is to be expected since the corrected LP model coefficients were derived with the purpose of eliminating mismatch between the LP predictions and the actual operating measurements.

FIG. 7 uses the Fluid Catalytic Cracker example to illustrate statistical analyses of the quality of the uncorrected LP predictions relative to the actual operation. Table 710 compares LP predictions using uncorrected LP model coefficients with actual measurements from the operation. Two dependent variables are shown-propane 710A and propylene 710B. Actual propane flow averaged over the historical record is 1149 barrels per day (711) while the uncorrected LP prediction of propane is 1102 barrels per day (713). The error between the uncorrected LP prediction for propane and its actual flow is 4% (715). A statistical check is performed on the error and reported as a verbal cue (717) to whether the propane LP model coefficients require updating or not (not in this case). The statistical check is be based on one of many techniques familiar to those practiced in the art, including comparing the size of the error against a threshold and comparing the error to the standard deviation of the average value of the measured variable. Actual propylene flow averaged over the historical record is 4063 barrels per day (712) while the uncorrected LP prediction of propylene is 3646 barrels per day (714). The error between the uncorrected LP prediction for propylene and its actual flow is 10.3% (716). A statistical check is performed on the error and reported as a verbal cue (718) to whether the propylene LP model coefficients require updating or not (they do in this case).

Table 720 summarizes statistical checks on the quality of the uncorrected LP model shift vectors. Cross correlation between the LP prediction error and the independent variables is used as the means to judge LP coefficient adequacy. *Kettaheh and Wold* referred to earlier is a good reference defining cross correlation which is a technique familiar to those skilled in the art. The cross correlation between sulfur and propane prediction error (721) is 0.01, and the cross correlation between aromatics and propane prediction error (723) is 0.08. A statistical check on the significance of the sulfur/propane prediction error (725) shows that the correlation is not significant as indicated by "No". A statistical check on the significance of the aromatics/propane prediction error (727) shows that the correlation is not significant as indicated by "No". Such statistical checks are familiar to those skilled in the art and include comparing the cross correlation to a numerical threshold. The cross correlation between sulfur and propylene prediction error (722) is 0.00, and the cross correlation between aromatics and propylene prediction error (724) is −0.64. A statistical check on the significance of the sulfur/propylene prediction error (726) shows that the correlation is not significant as indicated by "No". A statistical check on the significance of the aromatics/propylene prediction error (728) shows that the correlation is significant as indicated by "Yes".

Table 730 compares LP predictions using corrected LP model coefficients with actual measurements from the operation. Actual propane flow averaged over the historical record is 1149 barrels per day (731) while the corrected LP prediction of propane is 1148 barrels per day (733). The error between the corrected LP prediction for propane and its actual flow is 0.1% (735). A statistical check is performed on the error and reported as a verbal cue (737) to whether the propane LP model coefficients require updating or not (not in this case). The statistical check is be based on one of many techniques familiar to those practiced in the art, including comparing the size of the error against a threshold and comparing the error to the standard deviation of the average value of the measured variable. Actual propylene flow averaged over the historical record is 4063 barrels per day (732) while the corrected LP prediction of propylene is 4067 barrels per day (734). The error between the corrected LP prediction for propylene and its actual flow is −0.1% (736). A statistical check is performed on the error and reported as a verbal cue (738) to whether the propylene LP model coefficients require updating or not (not in this case).

Figure 8:
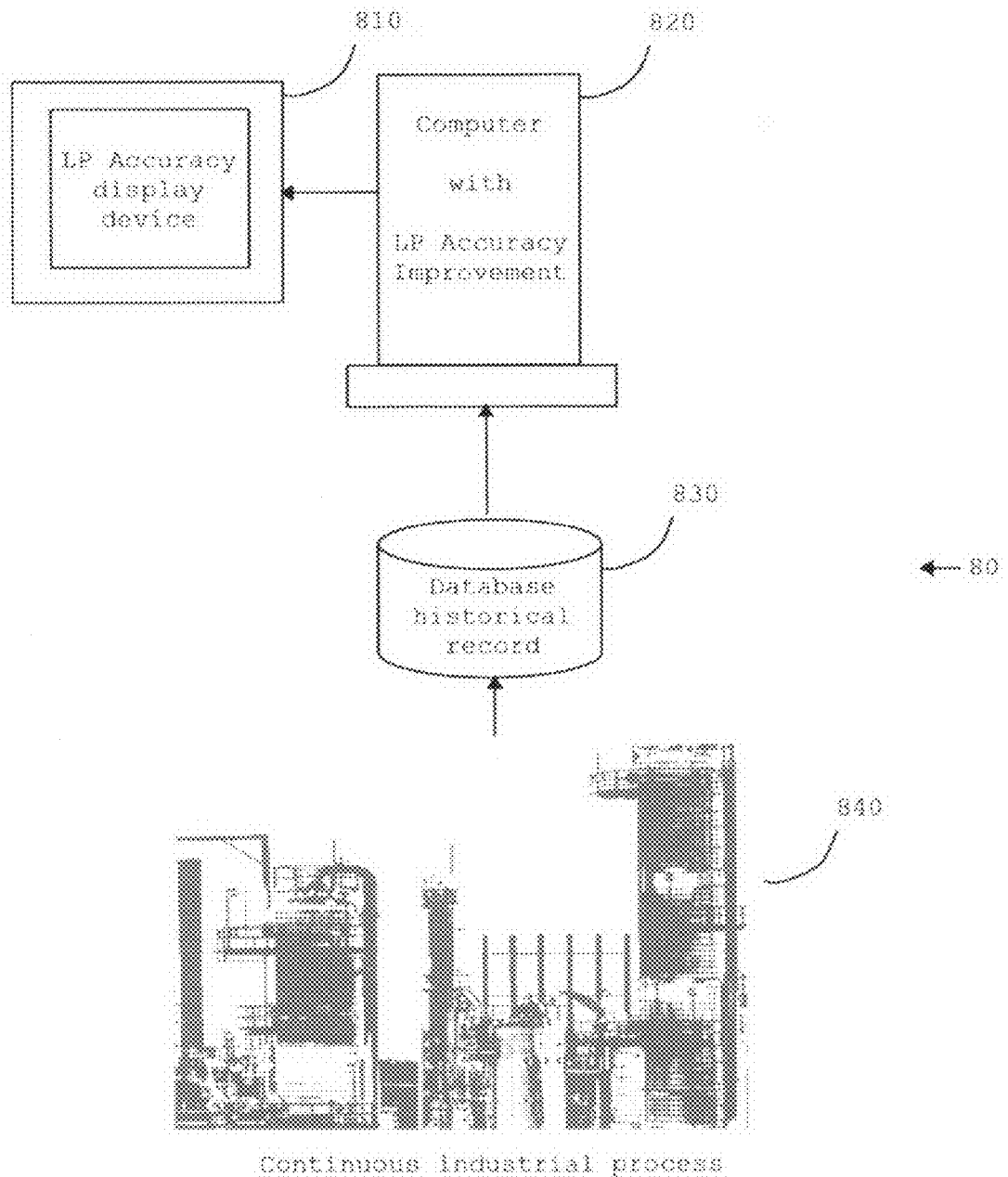
FIG. 8 comprises a block diagram showing at a high level a computer display 810, a computer 820, a database 830, and a continuous industrial process 840. The continuous industrial process is an embodiment an "operation". A specific embodiment of a continuous industrial process is an oil refinery. Measured input variables and output variables from the continuous industrial process are recorded in the database, forming part of a historical record. Independent and dependent variables as required by the LP model of the continuous industrial process are also recorded in the database, forming another part of the historical record. The computer comprises the LP model, any reference models, all calculations, relationships, rules and algorithms necessary to implement the current invention. The computer-produced results of the current invention include measurements, both graphical, verbal and numerical of the accuracy of the LP model. The computer-produced results of the current invention further include recommended actions for improving the accuracy of the LP model of the continuous industrial process. The display presents the results, as calculated by the computer, algorithms, etc., of the measured LP model accuracy as well as the recommended actions for improving the LP model accuracy, to a user or users capable of acting on the recommendations, thereby improving the accuracy of the LP model. The displayed results include numerical, verbal and or graphical information. The LP model with improved accuracy more closely represents the operation of the continuous industrial process, thereby benefiting the operators and or owners of the continuous industrial process via improved operation, economic or otherwise.

FIG. 8 comprises a block diagram showing at a high level a computer display 810, a computer 820, a database 830, and a continuous industrial process 840. The continuous industrial process is an embodiment an "operation". For purposes of discussion, a specific embodiment of a continuous industrial process is an oil refinery. The oil refinery contains instrumentation which measures the current state of the process. Such instrumentation typically includes automated flow sensing elements, temperature sensing elements, pressure sensing elements, composition sensing elements and others. The refinery also contains sample locations such that products can be manually sampled by a person and analyzed in a laboratory using analytical equipment and procedures. Both the automated sensing elements and the laboratory analysis results are transmitted by electronic means to a database where they are stored. In a refinery, such databases typically store thousands of such continuous and discrete measurements at a high frequency, typically once per minute. This historical record persist for years and is usually made available via software database connections for further display and analysis.

The computer depicted in FIG. 8 contains at least one LP model of the continuous industrial process (an oil refinery as discussed here). The computer further contains the means to extract all of the historical data from the database so that a measurement of the LP model accuracy can be performed. These extracted historical data contain a set of measured input variables and measured dependent variables necessary to enable simulated values from the LP to be calculated for all points of interest from the historical record. Typical measured independent variables might include feed rate, feed composition, and reactor conditions. Typical dependent variables might include product flowrates and compositions.

The computer in FIG. 8 also contains any rules, heuristics and algorithms to find and correct problematic data, before it is used in the calculations for the LP model accuracy.

Once the historical data have been extracted from the database and cleansed by the data-checking algorithms, the computer performs a set of calculations designed to compare the predicted LP model values over a time period with the counterpart values measured from the continuous industrial process (refinery), via the database.

When the calculations relating to LP model accuracy are complete, the results are sent to a display device so that they can be acted on, either by a person or by another automated process, for example another computer program. The display device presents measurements of the accuracy of the LP model (as compared to the continuous industrial process) using graphs, numerical tables and or words. The display device further presents suggested corrective action to make the LP model more accurate, relative to the continuous industrial process. Such corrective action includes updated numerical values for LP model coefficients. The display device further presents measurements of the expected improvements in the LP model, assuming that the new LP coefficients are deployed in the suggested manner.

In summary, the accuracy of an LP model of a continuous industrial operation can be measured and improved using the components diagrammed in FIG. 8. In doing so the improved LP model of the continuous industrial process will represent the process with increased fidelity, leading to concrete benefits for the owners and or operators of the process. Such benefits include making better economic decisions relative to purchase of the optimal feedstocks, reducing energy consumption of the process, and making products more cheaply.

The particular implementations described, and the discussions regarding details, and the specifics of the figures included herein, are purely exemplary; these implementations and the examples of them, may be modified, rearranged and/or enhanced without departing from the principles of the present invention.

The particular features of the user interface and the performance of the application, will depend on the architecture used to implement a system of the present invention, the operating system of the computers selected, the communications channel selected, and the software code written. It is not necessary to describe the details of such programming to permit a person of ordinary skill in the art to implement an application and user interface suitable for incorporation in a computer system within the scope of the present invention. The details of the software design and programming necessary to implement the principles of the present invention are readily understood from the description herein. However, in the interest of redundancy, exemplary code for a preferred implementation is given in APPENDIX A.

Various additional modifications of the described embodiments of the invention specifically illustrated and described herein will be apparent to those skilled in the art, particularly in light of the teachings of this invention. It is intended that the invention cover all modifications and embodiments which fall within the spirit and scope of the invention. Thus, while preferred embodiments of the present invention have been disclosed, it will be appreciated that it is not limited thereto but may be otherwise embodied within the scope of the following claims.

I claim as my invention:

1. A computer-implemented method for enabling the rapid appraisal of and for improving the accuracy of a Linear Program model relative to a corresponding continuous industrial process comprising the steps of:
   a) providing said continuous industrial process, said continuous industrial process having
      at least one measured input variable having a setting value for adjusting said continuous industrial process, and
      at least one measured output variable having a measurable value;
   b) providing a Linear Program model of said continuous industrial process,
      the Linear Program model having
         a first set of independent variables having a value for each of said measured input variables,
      the Linear Program model further having
         a first set of dependent variables having a value for each of said measured output variables;
      the Linear Program model further having
         a first set of Linear Program model coefficients comprising base coefficients;
   c) providing a historical record of operating conditions for said continuous industrial process, said historical record of operating conditions having
      at least one set of historical values for said first set of independent variables, and
      at least one corresponding set of historical values for said first set of dependent variables;
   d) screening said historical record according to at least one predetermined rule,
      the predetermined rule identifying screened operating data, said screened operating data comprising any of said historical record having a quality selected from the group consisting of bad and noisy,
      the predetermined rule further performing upon said screened operating data an action selected from the group of discard, correct, limit, and filter operating data so identified;
   e) calculating the uncorrected Linear Program predictions of said Linear Program model,
      said uncorrected Linear Program predictions comprising
         a first Linear Program calculation of said first set of dependent variables, said first Linear Program calculation performed using
         said first set of Linear Program model coefficients, and
         said at least one set of historical values for said first set of independent variables;
   f) using the information contained in said uncorrected Linear Program predictions together with the corresponding set of historical values for said first set of modeled dependent variables, in order to display verbal and numerical suggested actions to improve the accuracy of said Linear Program,
   whereby said method for evaluating the accuracy of a Linear Program model relative to a corresponding continuous industrial process results in substantially improved accuracy for said Linear Program model. Said Linear program model now having improved accuracy, more closely matches said continuous industrial process, thereby enabling improved operation, economic or otherwise of said continuous industrial process.

2. The method of claim 1, further comprising the steps of:
   g) calculating a prediction error
      said prediction error being calculated by means of taking the difference between said uncorrected Linear Program predictions and said at least one set of historical values for said first set of dependent variables;
   h) plotting said prediction error for each of said first set of dependent variables relative to each of said first set of independent variables;
   whereby said plotting indicates the degree of cross correlation between each of said prediction errors and each of said first set of independent variables.

3. The method of claim 2, further comprising the steps of:
   i) calculating a numerical average for each of said prediction errors for each of said first set of dependent variables;
   j) comparing each of said numerical averages for each of said prediction errors for each of said first set of dependent variables with statistically valid limits.

4. The method of claim 3, wherein said comparison further comprises
   k) displaying said numerical average for each of said prediction errors for each of said first set of dependent variables;
   l) displaying a verbal suggested action based on each of said comparisons in step k,
   whereby said numerical averages enable a rapid appraisal of the accuracy of said Linear Program model.

5. The method of claim 1 wherein said first set of Linear Program model coefficients further comprises shift coefficients.

6. The method of claim 5, further comprising the steps of:
   m) calculating a numerical cross correlation value for each of said prediction errors for each of said first set of dependent variables relative to each of said first set of independent variables;
   n) comparing each of said numerical cross correlation values for each of said prediction errors for each of said first set of dependent variables relative to each of said first set of independent variables with statistically valid limits.

7. The method of claim 6, further comprising the steps of:
   o) displaying said numerical cross correlation value for each of said prediction errors for each of said first set of dependent variables relative to each of said first set of independent variables;
   p) displaying a verbal suggested action based on each of said comparisons in step o,
   whereby said numerical cross correlations enable a rapid appraisal of the accuracy of said Linear Program model.

8. A computer-implemented system for enabling the rapid appraisal of and for improving the accuracy of a Linear Program model relative to a corresponding continuous industrial process comprising:
   a computer, said computer having first software, said first software comprising an implementation of said computer-implemented system for enabling the rapid appraisal of and for improving the accuracy of a Linear Program model;
   said continuous industrial process having at least one measured input variable having a setting value for adjusting said continuous industrial process, and at least one measured output variable having a measurable value;

said Linear Program model having a first set of independent variables having a value for each of said measured input variables, said Linear Program model further having a first set of dependent variables having a value for each of said measured output variables, and said Linear Program model further having a first set of Linear Program model coefficients comprising base coefficients;

a historical record of operating conditions for said continuous industrial process, said historical record of operating conditions having, at least one set of historical values for said first set of independent variables, at least one set of historical values for said first set of dependent variables;

software for screening said historical record according to at least one predetermined rule, the predetermined rule identifying screened operating data, comprising any of said historical record having a quality selected from the group consisting of bad and noisy, the predetermined rule further performing upon said screened operating data an action selected from the group of discard, correct, limit, and filter operating data so identified;

a set of uncorrected Linear Program predictions of said Linear Program model, said set of uncorrected Linear Program predictions comprising a first Linear Program calculation of said first set of dependent variables, said first Linear Program calculation performed using said first set of Linear Program model coefficients said at least one set of historical values for said first set of independent variables;

a means of comparing said uncorrected Linear Program predictions with said at least one set of historical values for said first set of dependent variables, said comparison further comprising a display showing verbal and numerical suggested actions to improve the accuracy of said Linear Program, whereby said system for enabling the rapid appraisal of and for improving the accuracy of a Linear Program model relative to a corresponding continuous industrial process has substantially improved accuracy of said Linear Program model. Said Linear Program model mow having improved accuracy, more closely matches said continuous industrial process, thereby enabling improved operation, economic or otherwise of said continuous industrial process.

9. The apparatus of claim 8 wherein said system for enabling the rapid appraisal of and for improving the accuracy of a Linear Program model relative to a corresponding continuous industrial process further comprises a prediction error, said prediction error being calculated by means of taking the difference between said uncorrected Linear Program predictions and said at least one set of historical values for said first set of dependent variables;

a plot of said prediction error for each of said first set of dependent variables relative to each of said first set of independent variables, whereby said plot indicates the degree of cross correlation between each of said prediction errors and each of said first set of independent variables.

10. The apparatus of claim 9 wherein said system for enabling the rapid appraisal of and for improving the accuracy of a Linear Program model relative to a corresponding continuous industrial process further comprises the calculation of a numerical average for each of said prediction errors for each of said first set of dependent variables;

a means of comparing each of said numerical averages for each of said prediction errors for each of said first set of dependent variables with statistically valid limits, whereby said numerical averages enable a rapid appraisal of the accuracy of said Linear Program model.

11. The apparatus of claim 10 wherein said system for enabling the rapid appraisal of and for improving the accuracy of a Linear Program model relative to a corresponding continuous industrial process further comprises a display showing said numerical average for each of said prediction errors for each of said first set of dependent variables;

a display showing a verbal suggested action for each of said comparisons of said numerical averages, whereby said numerical averages enable a rapid appraisal of the accuracy of said Linear Program model.

12. The apparatus of claim 8 wherein said first set of Linear Program model coefficients further comprises shift coefficients.

13. The apparatus of claim 12 wherein said system for enabling the rapid appraisal of and for improving the accuracy of a Linear Program model relative to a corresponding continuous industrial process further comprises the calculation of a numerical cross correlation value for each of said prediction errors for each of said first set of dependent variables relative to each of said first set of independent variables;

a means of comparing each of said numerical cross correlation values for each of said prediction errors for each of said first set of dependent variables relative to each of said first set of independent variables with statistically valid limits, whereby said numerical cross correlations enable a rapid appraisal of the accuracy of said Linear Program model.

14. The apparatus of claim 13 wherein said system for enabling the rapid appraisal of and for improving the accuracy of a Linear Program model relative to a corresponding continuous industrial process further comprises a display showing said numerical cross correlation value for each of said prediction errors for each of said first set of dependent variables relative to each of said first set of independent variables;

a display showing a verbal suggested action for each of said comparisons of said numerical cross correlations, whereby said numerical cross correlations enable a rapid appraisal of the accuracy of said Linear Program model.

15. A method for enabling the rapid appraisal of and for improving the accuracy of a Linear Program model relative to a corresponding continuous industrial process comprising the steps of:

a) providing said continuous industrial process, said continuous industrial process having at least one measured input variable having a setting value for adjusting said continuous industrial process, and
at least one measured output variable having a measurable value;
b) providing a Linear Program model of said continuous industrial process,
the Linear Program model having
a first set of independent variables having a value for each of said measured input variables,
said Linear Program model further having
a first set of dependent variables having a value for each of said measured output variables
said Linear Program model further having
a first set of model coefficients comprising base coefficients;
c) providing a calibrated reference model of said continuous industrial process,
the calibrated reference model having
a second set of independent variables having a value for each of said measured input variables,
the calibrated reference model further having
a second set of dependent variables having a value for each of said measured output variables;
a set of model parameters;
d) defining a scope for said calibrated reference model, said scope representing
at least a portion of said continuous industrial process, said scope comprising
a third set of independent variables consisting of at least a portion of said first set of independent variables,
wherein at least one of said third set of independent variables corresponds to one of said at least one measured input variable, and
said scope further comprising
a third set of dependent variables consisting of at least a portion of said first set of dependent variables;
wherein at least one of said third set of dependent variables corresponds to one of said at least one measured output variable;
e) providing a historical record of operating conditions for said continuous industrial process, said historical record of operating conditions having,
at least one set of historical values for said first set of independent variables,
at least one set of historical values for said first set of dependent variables;
f) screening said historical record according to at least one predetermined rule,
the predetermined rule identifying screened operating data, comprising any of said historical record having a quality selected from the group consisting of bad and noisy,
the predetermined rule further performing upon said screened operating data an action selected from the group of discard, correct, limit, and filter operating data so identified;
g) using said calibrated reference model to calculate a calibrated reference model prediction
said calibrated reference model prediction further consisting of
a set of values for each of said third set of dependent variables calculated by said calibrated reference model
said calibrated reference model prediction further being calculated at
each point in said historical record;
h) calculating a calibrated reference model prediction error,
said calibrated reference model prediction error being equal to the sum of the squares of the differences between said calibrated reference model predictions and each corresponding of said at least one set of historical values for said first set of dependent variables;
i) producing a recalibrated reference model by selecting said recalibrated reference model parameters so as to minimize said recalibrated reference model prediction error;
j) calculating new Linear Program-model coefficients, said calculation further comprising
use of said recalibrated reference model to evaluate the change in each of said third set of dependent variables relative to each of said third set of independent variables,
whereby said method for enabling the rapid appraisal of and for improving the accuracy of a Linear Program model relative to continuous industrial process provides the best match between said Linear Program model and said historical record.

16. The method of claim 15, further comprising the steps of:
replacing said calibrated reference model with a calibrated nonlinear model.

17. The method of claim 16, further comprising the steps of:
replacing said calibrated reference model with a Linear Program model.

18. The method of claim 17, further comprising the steps of:
k) Calculating corrected Linear Program predictions of said Linear Program model,
said corrected Linear Program predictions comprising
a second Linear Program calculation of said third set of dependent variables, said second Linear Program calculation performed using
said new Linear Program model coefficients
said at least one set of historical values for said third set of independent variables;
l) comparing said corrected Linear Program predictions with said at least one set of historical values for said third set of dependent variables,
whereby said display shows the accuracy of said corrected Linear Program predictions relative to said historical record.

19. The method of claim 18, further comprising the steps of:
m) calculating a prediction error
said prediction error being calculated by means of taking the difference between said corrected Linear Program predictions and said at least one set of historical values for said third set of dependent variables;
n) plotting said prediction error for each of said third set of dependent variables relative to each of said third set of independent variables,
whereby said plotting indicates the degree of cross correlation between each of said third set of prediction errors and each of said first set of independent variables.

20. The method of claim 19, further comprising the steps of:
o) calculating a numerical average for each of said prediction errors for each of said third set of dependent variables;

p) comparing each of said numerical averages for each of said prediction errors for each of said third set of dependent variables with statistically valid limits.

21. The method of claim 20, further comprising the steps of:
   q) displaying said numerical average for each of said prediction errors for each of said third set of dependent variables;
   r) displaying a verbal suggested action based on each of said comparisons in step s.

22. The method of claim 15 wherein said first set of Linear Program model coefficients further comprises shift coefficients.

23. The method of claim 22, further comprising the steps of:
   s) calculating a numerical cross correlation value for each of said prediction errors for each of said third set of dependent variables relative to each of said third set of independent variables;
   t) comparing each of said numerical cross correlation values for each of said prediction errors for each of said third set of dependent variables relative to each of said third set of independent variables with statistically valid limits.

24. The method of claim 23, further comprising the steps of:
   u) displaying said numerical cross correlation value for each of said prediction errors for each of said third set of dependent variables relative to each of said third set of independent variables;
   v) displaying a verbal suggested action based on each of said comparisons in step u.

25. A computer-implemented system for enabling the rapid appraisal of and for improving the accuracy of a Linear Program model relative to a corresponding continuous industrial process comprising:
   a computer, said computer having first software, said first software comprising an implementation of said system for enabling the rapid appraisal of and for improving the accuracy of a Linear Program model relative to a corresponding continuous industrial process,
      said computer further having second software, said second software comprising a calibrated reference model of said continuous industrial process;
   said continuous industrial process having
      at least one measured input variable having a setting value for adjusting said continuous industrial process, and
      at least one measured output variable having a measurable value;
   said Linear Program model having
      a first set of independent variables having a value for each of said measured input variables,
      said Linear Program model further having
         a first set of dependent variables having a value for each of said measured output variables
      said Linear Program model further having
         a first set of Linear Program model coefficients comprising
            base coefficients;
   a) providing said continuous industrial process, said continuous industrial process having
      at least one measured input variable having a setting value for adjusting said continuous industrial process, and
      at least one measured output variable having a measurable value;
   b) providing a Linear Program model of said continuous industrial process,
      said Linear Program model having
         a first set of independent variables having a value for each of said measured input variables
      the Linear Program model further having
         a first set of dependent variables having a value for each of said measured output variables
      the Linear Program model further having
         a first set of model coefficients comprising
            base coefficients;
   c) providing a calibrated reference model of said continuous industrial process,
      the calibrated reference model having
         a second set of independent variables having a value for each of said measured input variables,
      the calibrated reference model further having
         a second set of dependent variables having a value for each of said measured output variables;
         a set of model parameters;
   d) defining a scope for said calibrated reference model,
      said scope representing
         at least a portion of said continuous industrial process,
      said scope comprising
         a third set of independent variables consisting of at least a portion of said first set of independent variables,
            wherein at least one of said third set of independent variables corresponds to one of said at least one measured input variable, and
      said scope further comprising
         a third set of dependent variables consisting of at least a portion of said first set of dependent variables;
            wherein at least one of said third set of dependent variables corresponds to one of said at least one measured output variable;
   e) providing a historical record of operating conditions for said continuous industrial process, said historical record of operating conditions having,
      at least one set of historical values for said first set of independent variables,
      at least one set of historical values for said first set of dependent variables;
   f) screening said historical record according to at least on predetermined rule,
      the predetermined rule identifying screened operating data, comprising any of said historical record having a quality selected from the group consisting of bad and noisy,
      the predetermined rule further performing upon said screened operating data an action selected from the group of discard, correct, limit, and filter operating data so identified;
   g) using said calibrated reference model to calculate a calibrated reference model prediction
      said calibrated reference model prediction further consisting of
         a set of values for each of said third set of dependent variables calculated by said calibrated reference model
      said calibrated reference model prediction further being calculated at each point in said historical record;
   h) calculating a calibrated reference model prediction error,
      said calibrated reference model prediction error being equal to the sum of the squares of the differences between said calibrated reference model predictions and each corresponding of said at least one set of historical values for said first set of dependent variables;

i) producing a recalibrated reference model by selecting said recalibrated reference model parameters so as to minimize set recalibrated reference model prediction error;

j) calculating new Linear Program model coefficients,
said calculation further comprising
use of said recalibrated reference model to evaluate the change in each of said third set of dependent variables relative to each of said third set of independent variables, whereby said computer-implemented system for enabling the rapid appraisal of and for improving the accuracy of a Linear Program model relative to continuous industrial process provides the best match between said Linear Program model and said historical record. Said Linear program model now having improved accuracy, more closely matches said continuous industrial process, thereby enabling improved operation, economic or otherwise of said continuous industrial process.

26. The apparatus of claim 25 wherein said computer-implemented system for enabling the rapid appraisal of and for improving the accuracy of a Linear Program model relative to continuous industrial process further comprises
replacing said calibrated reference model with a calibrated nonlinear model.

27. The apparatus of claim 26 wherein said computer-implemented system for enabling the rapid appraisal of and for improving the accuracy a Linear Program model relative to continuous industrial process further comprises
replacing said calibrated reference model with a Linear Program model.

28. The apparatus of claim 27 wherein said computer-implemented system for enabling the rapid appraisal of and for improving the accuracy a Linear Program model relative to continuous industrial process further comprises
a set of corrected Linear Program predictions of said Linear Program model,
said corrected Linear Program predictions comprising
a second Linear Program calculation of said third set of dependent variables, said second Linear Program calculation performed using
said new Linear Program base and shift model coefficients
said at least one set of historical values for said third set of independent variables, and
a comparison of said corrected Linear Program predictions with said at least one set of historical values for said third set of dependent variables.

29. The apparatus of claim 28 wherein said computer-implemented system for enabling the rapid appraisal of and for improving the accuracy a Linear Program model relative to continuous industrial process further comprises a calculated prediction error
said prediction error being calculated by means of taking the difference between said corrected Linear Program predictions and said at least one set of historical values for said third set of dependent variables, and
a set of plots of said prediction error for each of said third set of dependent variables relative to each of said third set of independent variables.

30. The apparatus of claim 29 wherein said computer-implemented system for enabling the rapid appraisal of and for improving the accuracy a Linear Program model relative to continuous industrial process further comprises
a calculation of a numerical average for each of said prediction errors for each of said third set of dependent variables,
a comparison of each of said numerical averages for each of said prediction errors for each of said third set of dependent variables with statistically valid limits.

31. The apparatus of claim 30 wherein said computer-implemented system for enabling the rapid appraisal of and for improving the accuracy a Linear Program model relative to continuous industrial process further comprises
a display of said numerical average for each of said prediction errors for each of said third set of dependent variables,
a verbal suggested action based on each of said displays of said numerical averages.

32. The apparatus of claim 25 wherein said first set of Linear Program model coefficients further comprises shift coefficients.

33. The apparatus of claim 32 wherein said computer-implemented system for enabling the rapid appraisal of and for improving the accuracy a Linear Program model relative to continuous industrial process further comprises
a calculation of a numerical cross correlation value for each of said prediction errors for each of said third set of dependent variables relative to each of said third set of independent variables;
a comparison of each of said numerical cross correlation values for each of said prediction errors for each of said third set of dependent variables relative to each of said third set of independent variables with statistically valid limits.

34. The apparatus of claim 33 wherein said computer-implemented system for enabling the rapid appraisal of and for improving the accuracy a Linear Program model relative to continuous industrial process further comprises
a display of said numerical cross correlation value for each of said prediction errors for each of said third set of dependent variables relative to each of said third set of independent variables;
a verbal suggested action based on each of said a display of said numerical cross correlation values.

* * * * *